United States Patent
Deodhar et al.

(10) Patent No.: US 10,754,675 B2
(45) Date of Patent: *Aug. 25, 2020

(54) IDENTIFYING ENTITIES IN A VIRTUALIZATION ENVIRONMENT

(71) Applicant: Nutanix, Inc., San Jose, CA (US)

(72) Inventors: Akshay Deodhar, Cupertino, CA (US); Venkata Vamsi Krishna Kothuri, San Jose, CA (US); Binny Gill, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,772

(22) Filed: Dec. 1, 2017

(65) Prior Publication Data

US 2018/0157507 A1 Jun. 7, 2018

Related U.S. Application Data

(60) Provisional application No. 62/430,798, filed on Dec. 6, 2016.

(51) Int. Cl.
*G06F 9/455* (2018.01)
*G06F 9/50* (2006.01)
(Continued)

(52) U.S. Cl.
CPC .......... *G06F 9/45533* (2013.01); *G06F 9/451* (2018.02); *G06F 9/45558* (2013.01);
(Continued)

(58) Field of Classification Search
CPC .. G06F 9/45533; G06F 9/45558; G06F 9/451; G06F 9/5027; G06F 2009/45583;
(Continued)

(56) References Cited

U.S. PATENT DOCUMENTS

| 7,961,722 B1 * | 6/2011 | Jankowski | G06F 9/46 370/381 |
| 8,505,006 B1 * | 8/2013 | Larkin | G06F 9/45537 718/1 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Meng Ai T An
*Assistant Examiner* — Michael W Ayers
(74) *Attorney, Agent, or Firm* — Foley & Lardner LLP

(57) ABSTRACT

A system and method include receiving, by a controller/service virtual machine, a first request associated with an element of a visualization environment using an application programming interface (API). The first request includes a context-specific identifier. The controller/service virtual machine resides on a host machine of the virtualization environment, and the element is operatively associated with the host machine. The system and method further include determining, by the controller/service virtual machine, a type of the context-specific identifier in the first request, and mapping, by the controller/service virtual machine, the context-specific identifier to a unique identifier associated with the element based upon the determined type.

28 Claims, 5 Drawing Sheets

300

(51) Int. Cl.
*G06F 9/451* (2018.01)
*G06F 16/28* (2019.01)
*H04L 29/06* (2006.01)
*H04L 29/12* (2006.01)

(52) U.S. Cl.
CPC .......... *G06F 9/5027* (2013.01); *G06F 16/288* (2019.01); *H04L 63/0876* (2013.01); *G06F 2009/45583* (2013.01); *H04L 61/6022* (2013.01)

(58) Field of Classification Search
CPC ........... G06F 17/30604; H04L 61/6022; H04L 63/0876
See application file for complete search history.

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 9,772,866 | B1 | 9/2017 | Aron et al. |
| 2005/0125625 | A1* | 6/2005 | Kilian ................... G06F 3/0611 711/202 |
| 2008/0127326 | A1* | 5/2008 | Dugan ................... G06F 9/5077 726/15 |
| 2010/0223613 | A1* | 9/2010 | Schneider ........... G06F 9/45558 718/1 |
| 2010/0313210 | A1 | 12/2010 | Lin et al. |
| 2012/0054744 | A1* | 3/2012 | Singh ..................... G06F 21/53 718/1 |
| 2012/0096461 | A1* | 4/2012 | Goswami ............ G06F 9/45558 718/1 |
| 2012/0331461 | A1* | 12/2012 | Fries ................... H04L 67/2861 718/1 |
| 2013/0125124 | A1* | 5/2013 | Kempf ................ G06F 9/45533 718/1 |
| 2013/0191826 | A1* | 7/2013 | Heninger ............ G06F 9/45533 718/1 |
| 2013/0308641 | A1* | 11/2013 | Ackley ............... H04L 45/7457 370/392 |
| 2015/0106805 | A1* | 4/2015 | Melander ........... G06F 9/45537 718/1 |
| 2015/0169206 | A1* | 6/2015 | Balakrishnan ...... G06F 3/04847 715/740 |
| 2015/0215308 | A1 | 7/2015 | Manolov et al. |
| 2015/0277861 | A1* | 10/2015 | Jennings ................... G06F 8/41 717/148 |

OTHER PUBLICATIONS

Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 3, 2017), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Cano, Ignacio, et al. "Curator: Self-Managing Storage for Enterprise Clusters" (Mar. 27, 2017), from https://www.usenix.org/conference/nsdi17/.

* cited by examiner

IDENTIFYING ENTITIES IN A VIRTUALIZATION ENVIRONMENT

CROSS REFERENCE TO RELATED PATENT APPLICATIONS

This application is a Non-Provisional application of U.S. Provisional Application No. 62/430,798, filed on Dec. 6, 2016, the entirety of which is incorporated by reference herein.

TECHNICAL FIELD

This disclosure generally relates to identification of entities in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that may run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines may run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple virtual machines to share the underlying physical resources so that during periods of inactivity of one virtual machine, other virtual machines may take advantage of the resource availability to process workloads. This may produce great efficiencies for the utilization of physical devices, and may result in reduced redundancies and better resource cost management.

Furthermore, there are now products that may aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY

In accordance with one aspect of the present disclosure, a system is disclosed. The system includes a plurality of host machines in a virtualization environment, each of the plurality of host machines including a controller/service virtual machine. The controller/service virtual machine is configured to receive a first request associated with an element of the virtualization environment using an application programming interface (API). The first request includes a context-specific identifier, and the element is operatively associated with the plurality of host machines whose controller/service virtual machine receives the first request. The controller/service virtual machine is also configured to determine a type of the context-specific identifier and map the first request from the context-specific identifier to a unique identifier associated with the element based on the determined type.

In accordance with another aspect of the present disclosure, a method is disclosed. The method includes receiving, by a controller/service virtual machine, a first request associated with an element of a visualization environment using an application programming interface (API). The first request includes a context-specific identifier and the controller/service virtual machine resides on a host machine of the virtualization environment. The element is operatively associated with the host machine. The method further includes determining, by the controller/service virtual machine, a type of the context-specific identifier included in the first request and mapping, by the controller/service virtual machine, the context-specific identifier to a unique identifier associated with the element based upon the determined type.

In accordance with yet another aspect of the present disclosure, a non-transitory computer readable media with computer-executable instructions embodied thereon is disclosed. The non-transitory computer readable media is configured such that, when executed by a processor of a virtualization environment, the computer-executable instructions embodied on the non-transitory computer readable media cause a controller/service virtual machine of the virtualization environment to perform a process that includes receiving, by the controller/service virtual machine, a first request associated with an element of the visualization environment using an application programming interface (API). The first request includes a context-specific identifier and the controller/service virtual machine resides on a host machine of the virtualization environment. The element is operatively associated with the host machine. The process also includes determining, by the controller/service virtual machine, a type of the context-specific identifier in the first request and mapping, by the controller/service virtual machine, the context-specific identifier to a unique identifier associated with the element based upon the determined type.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

The present disclosure is directed to implementing polymorphic identification of entities in a virtualization environment. A virtualization environment may comprise many kinds of heterogeneous entities, including software and hardware entities. As an example and not by way of limitation, entities may include virtual machines, virtual disks, virtual networks, physical nodes or host machines, clusters, physical disks, physical storage devices, physical network interfaces, user accounts, events, alerts, logfiles, etc. All of these various types of entities may be managed and accessed by virtualization software (for example, a controller virtual machine), and therefore each may need to be uniquely identifiable within the virtualization environment. Additionally, entities may be identified using multiple heterogeneous attributes associated with different entity types. For example, a virtual machine may be identifiable by a name (e.g., "PaloAltoVM1"), a network interface may be identifiable by a MAC address (e.g., 1234:5678:90AB:CDEF), and a physical storage device may be identifiable by number (e.g., 4567). From a user perspective, it may be desirable for a user to be able to identify an entity using various entity identifiers to, for example, make application programming interface (API) calls that reference the entity.

One approach may be to provide various APIs that support different kinds of identifiers. For example, a management service for the virtualization environment may implement various APIs to provide the CPU utilization of a physical node. One example API may identify the desired CPU by a string name (e.g., getCPUStatus(String machineName)), a second example API may identify the CPU by an integer number (getCPUStatus(Integer machineNumber)), and a third example API may identify the CPU by a MAC address in long integer form (e.g., getCPUStatus(Long macAddress)). However, providing multiple APIs may increase the complexity of preparing and maintaining code, since programmers and users may need to keep track of the various APIs and identifiers supported. The present disclosure provides an architecture for implementing polymorphic identification of entities in a virtualization environment, which allows the use of a single API to receive requests using heterogeneous identifiers.

Figure 1A:
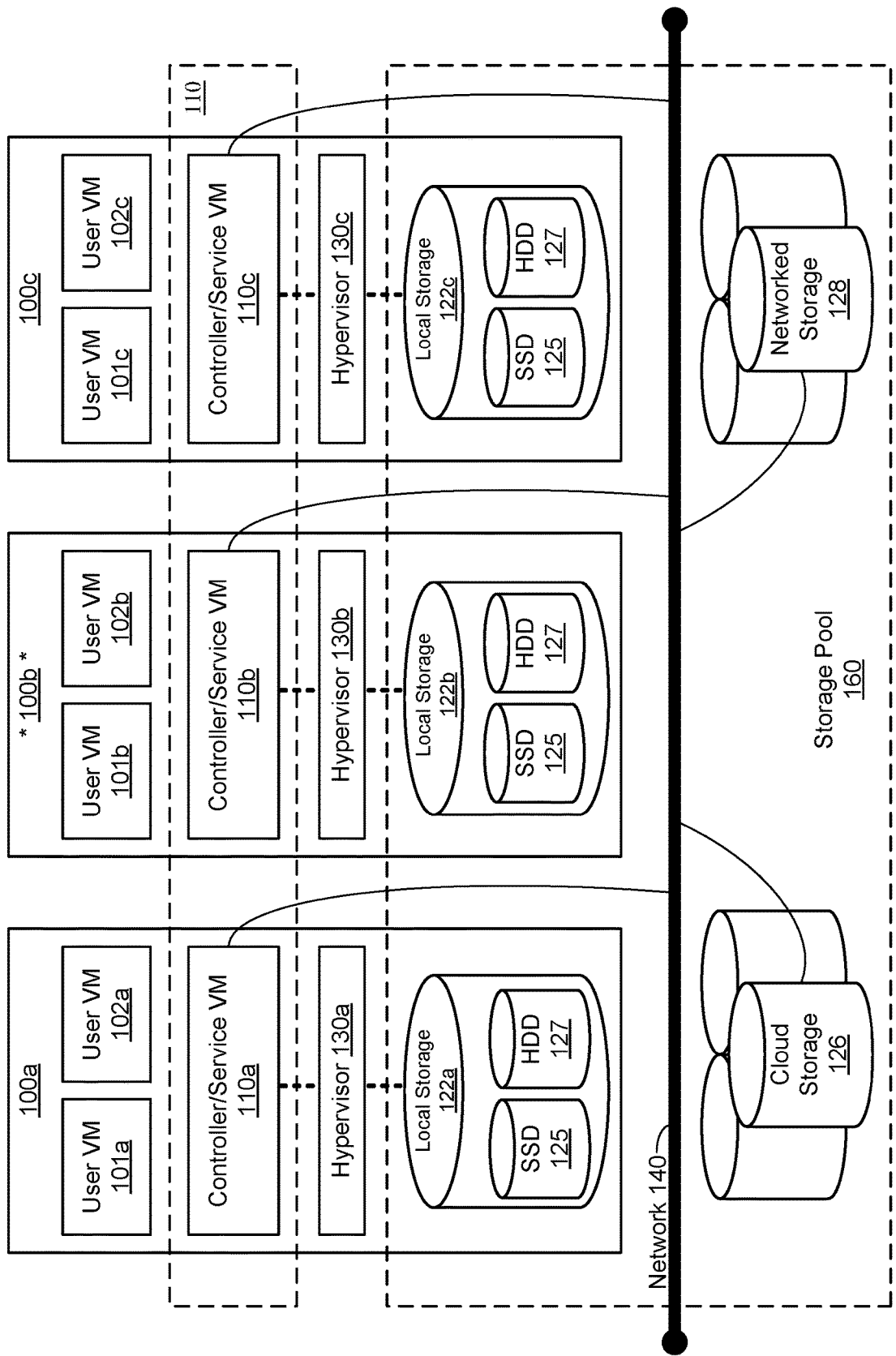
FIG. 1A illustrates a clustered virtualization environment, in accordance with some embodiments of the present disclosure.

FIG. 1A illustrates a clustered virtualization environment, in accordance with some embodiments of the present disclosure. The architecture of FIG. 1A may be implemented for a distributed platform that contains multiple host machines 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits local storage 122a-c that is within or directly attached to the server and/or appliance to be managed as part of storage pool 160. Examples of such storage include Solid State Drives 125 ("SSDs"), Hard Disk Drives 127 ("HDDs" or "spindle drives"), optical disk drives, external drives (e.g., a storage device connected to a host machine via a native drive interface or a direct attach serial interface), or any other directly attached storage. These collected storage devices, both local and networked, form the storage pool 160. Virtual disks (or "vDisks") may be structured from the storage devices in the storage pool 160, as described in more detail below. As used herein, the term vDisk refers to the storage abstraction that is exposed by a Controller/Service VM ("CVM") 110a-110c to be used by a user virtual machine. In some embodiments, the vDisk is exposed via iSCSI ("internet small computer system interface") or NFS ("network file system") and is mounted as a virtual disk on the user virtual machine.

Each of the host machines 100a-c runs virtualization software, such as VMWARE ESX(I), MICROSOFT HYPER-V, or REDHAT KVM. The virtualization software includes a hypervisor 130a-c to manage the interactions between the underlying hardware and one or more user virtual machines 101a, 102a, 101b, 102b, 101c, and 102c that run client software. Though not depicted in FIG. 1A, a hypervisor may connect to the network 140. In particular embodiments, each of the host machines 100a-c may be a physical hardware computing device. For example, in some embodiments, each of the host machines 100a-c may be a virtual machine.

The CVMs 110a-c are used to manage storage and input/output ("I/O") activities. These special virtual machines act as a storage controller in the currently described architecture. Multiple such storage controllers may coordinate within a cluster to form a unified storage controller system. The CVMs 110 may run as virtual machines on the various host machines 100a-c, and work together to form a distributed system 110 that manages all the storage resources, including the local storage 122a-c, the networked storage 128, and the cloud storage 126. The CVMs 110a-c may connect to the network 140 directly, or via a hypervisor. Since the CVMs 110a-c run independent of the hypervisors 130a-c, this means that the current approach may be used and implemented within any virtual machine architecture, since the CVMs of particular embodiments may be used in conjunction with any hypervisor from any virtualization vendor.

One of the host machines 100a-c may be designated as a leader node within a cluster of the host machines. For example, the host machine 100b, as indicated by the asterisks, may be a leader node. A leader node may have a software component designated to perform operations of the leader. For example, the CVM 110b on the host machine 100b may be designated to perform such operations. A leader may be responsible for monitoring or handling requests from other host machines or software components on other host machines throughout the virtualized environment. If a leader fails, a new leader may be designated. In some embodiments, a management module (e.g., in the form of an agent) may be running on the leader node.

Each of the CVMs 110a-c exports one or more block devices or NFS server targets that appear as disks to the user virtual machines 101 a-c and 102a-c. These disks are virtual, since they are implemented by the software running inside the CVMs 110a-c. Thus, to the user virtual machines 101a-c and 102a-c, the CVMs 110a-c appear to be exporting a clustered storage appliance that contains some disks. All user data (including the operating system) in the user virtual machines 101a-c and 102a-c reside on these virtual disks.

Significant performance advantages may be gained by allowing the virtualization system to access and utilize the local storage 122a-c as disclosed herein. This is because I/O performance is typically much faster when performing access to the local storage 122a-c as compared to performing access to networked storage 128 across the network 140. This faster performance for the local storage 122a-c may be increased even further by using certain types of optimized local storage devices, such as SSDs. Further details regarding methods and mechanisms for implementing the virtualization environment illustrated in FIG. 1A are described in U.S. Pat. No. 8,601,473, which is incorporated by reference in its entirety herein.

Figure 1B:
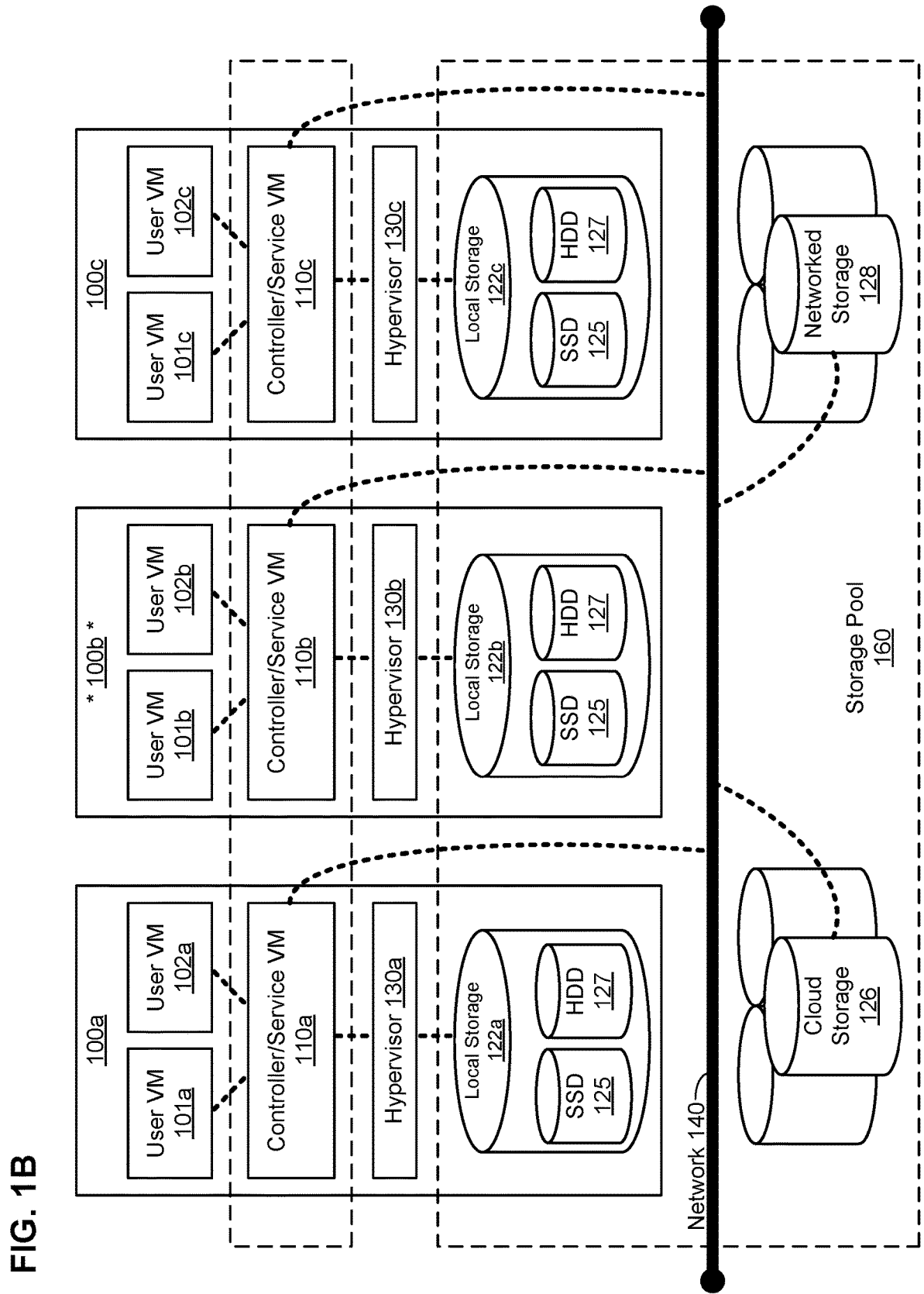
FIG. 1B illustrates data flow within the clustered virtualization environment of FIG. 1A, in accordance with some embodiments of the present disclosure.

FIG. 1B illustrates data flow within an example clustered virtualization environment, in accordance with some embodiments of the present disclosure. As described above, one or more user virtual machines and a CVM may run on each of the host machines 100a-c along with a hypervisor. As a user virtual machine performs I/O operations (e.g., a read operation or a write operation), the I/O commands of the user virtual machine may be sent to the hypervisor that shares the same server as the user virtual machine. For example, the hypervisor may present to the virtual machines an emulated storage controller, receive an I/O command and facilitate the performance of the I/O command (e.g., via interfacing with storage that is the object of the command, or passing the command to a service that will perform the I/O command).

An emulated storage controller may facilitate I/O operations between a user virtual machine and a vDisk. A vDisk may present to a user virtual machine as one or more discrete storage drives, but each vDisk may correspond to any part of one or more drives within the storage pool 160. Additionally or alternatively, the CVM 110a-c may present an emulated storage controller either to the hypervisor or to user virtual machines to facilitate I/O operations. The CVMs 110a-c may be connected to storage within the storage pool 160. Thus, the CVM 110a may have the ability to perform I/O operations using the local storage 122a within the same host machine 100a, by connecting via the network 140 to the cloud storage 126 or the networked storage 128, or by connecting via the network 140 to the local storage 122b-c within another one of the host machines 100b-c (e.g., via connecting to another one of the CVMs 110b or 110c). The CVMs 110b-c may be operate similarly. In some embodiments, any suitable computing system 400 may be used to implement the host machines 100a-c.

The present disclosure provides systems and methods for an API that performs polymorphic identification of entities in the virtualization environment discussed above, so that the API may be called using multiple types of identifiers.

Figure 2:
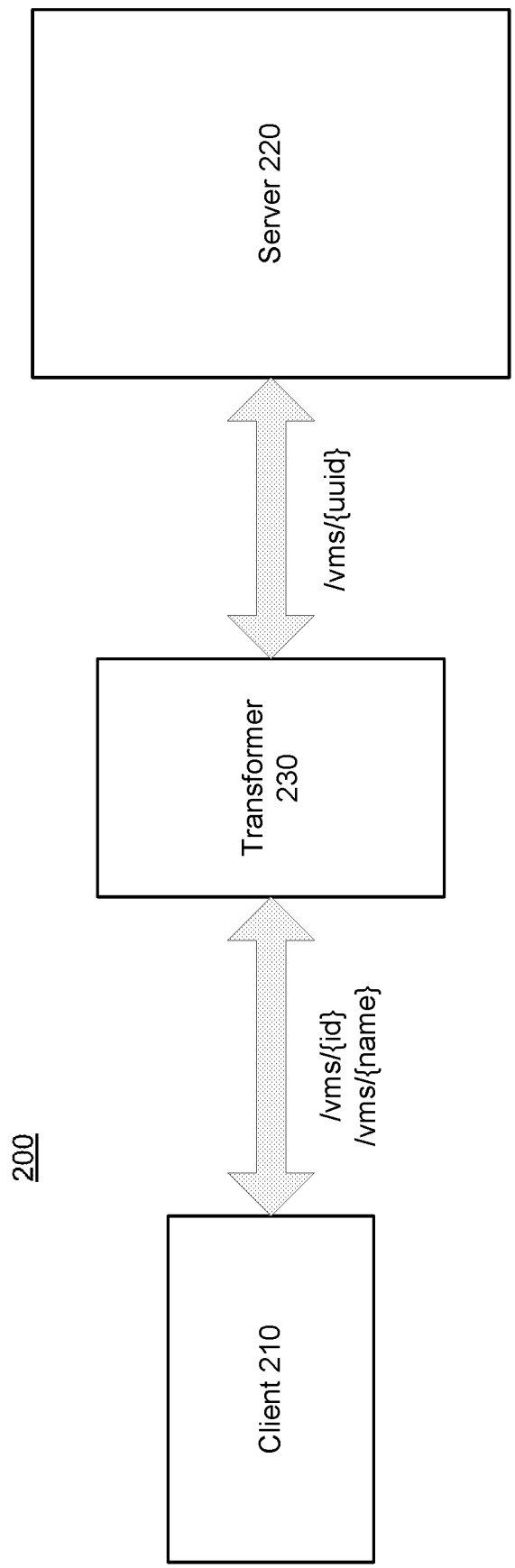
FIG. 2 illustrates a dataflow diagram for an Application Programming Interface ("API") framework that supports multiple identifier types, in accordance with some embodiments of the present disclosure.

FIG. 2 illustrates a dataflow diagram for an API framework 200 that supports multiple identifier types, in accordance with some embodiments of the present disclosure. The API framework 200 includes a client 210 that sends an API request using an identifier type, an interceptor/transformer 230 that transforms the identifier type to a unique identifier, and a server 220 that fulfills the API request. The client 210 may be a user (e.g., user virtual machine) that generates an API call/request through a user interface, such as a graphical user interface (GUI), a command line interface, a script, etc. In another example, the client 210 may be a monitoring service, event detection service, or any other element of the virtualization environment that generates the API call/request to obtain or alter information about a particular entity. In some embodiments, the server 230 may be one or more of the CVMs 110a-c that retrieves information to satisfy the API request from the client 210. The interceptor/transformer 230 may be part (e.g., a module) of the server 230, or may be a separate element of the virtualization environment. While specific reference to the CVMs 110a-c is made throughout this disclosure, the disclosure contemplates that any component, or combination of components, of the virtualization environment may provide the APIs of the described embodiments.

In some embodiments, the CVMs 110a-c may receive a first request associated with one of the elements (e.g., an entity within the virtualization environment) using an API, the first request including a context-specific identifier. For example, the CVMs 110a-c may receive an API request for the available memory of a node, and the node may be identified by a string representing its name in the virtualization environment. In some embodiments, the context-specific identifier may represent a hierarchical listing of a plurality of entity-type nodes in an entity-relationship graph, wherein each of the entity-type nodes represents an element in the virtualization environment. This hierarchy may be represented as a string of characters describing a path that identifies the location and name of the node (e.g., "/WestCoast/California/PaloAlto/Node4."

In some embodiments, the CVMs 110a-c may determine, using reflection, a type of the context-specific identifier. For example, the CVMs 110a-c may use type introspection to determine that the type of the identifier included in the API request is a string data type. In some embodiments, the CVMs 110a-c may use type introspection to determine that the type of the identifier is a class that inherits from an identifier type class. For example, a type may be a GlobalPath data type—storing a path of the element—that inherits from a general GlobalIdentifier class.

In some embodiments, the CVMs 110a-c process the first request based on a mapping, according to the determined type, from the context-specific identifier to a unique identifier associated with the element. For example, the CVMs 110a-c may map the path string "/WestCoast/California/PaloAlto/Node4" to a universal unique identifier (UUID), such as a 128-bit number generated by the CVMs. In some embodiments, the unique identifier may be a UUID, a MAC Address, disk address, or other device identifier.

In some embodiments, the CVMs 110a-c perform code introspection to determine the type of the context-specific identifier and determines a function, based on the determined type, that converts the context-specific identifier to a unique identifier. For example, the CVMs 110a-c may use code introspection to determine that the identifier included with the API request is of a GlobalPath data type and that the GlobalPath data type inherits from the GlobalIdentifier class. The GlobalPath data type may represent the identifier using a string to represent the path of the element, while the GlobalIdentifier class may use a UUID to represent the same element. Using object-oriented polymorphism, the CVMs 110a-c may identify a function of the GlobalPath class that transforms the GlobalPath identifier to a GlobalIdentifier identifier. For example, all classes that inherit from GlobalIdentifier may be required to implement a function called convertToGlobalId( ) that converts the child class identifier to a global identifier.

In some embodiments, the CVMs 110a-c perform the conversion using the function to map, based on the type, the context-specific identifier to the unique identifier associated with the element. For example, the CVMs 110a-c may use the identified function to map the path identifier to a UUID. The function may use any known methods to map the context-specific identifier to a unique identifier. For example, the function may access a database that contains information about the entities indexed by unique identifier, and query the database for an entity that matches the context-specific identifier. In the example above, the CVMs 110a-c may query an entity database to return the UUID of any nodes with a global path "/WestCoast/California/PaloAlto/Node4." In another example, the function may perform a mathematical formula to generate a UUID from the context-specific identifier.

Once the CVMs 110a-c have a unique identifier for the element, the CVMs may fulfill the API request associated with the element. In some embodiments, the CVMs 110a-c may transmit a second request, the second request comprising the unique identifier associated with the element and receive a response to the second request, the response comprising the unique identifier. For example, if the API request was to obtain the available memory for a node, the CVMs 110a-c may use the UUID of the node to query a database to locate the network address of the node, and then send a request to the node to obtain its current memory usage. In another example, the CVMs 110a-c may access a resources database that has resource availability information for various entities in the virtualization environment, and may query the resources database for the available memory of the node.

In some embodiments, the CVMs 110a-c may transmit a response to the first request by the client 210, the first response comprising the context-specific identifier. For example, the CVMs 110a-c may return the available memory for the requested node to the requesting client along with the global path of the node.

Figure 3:
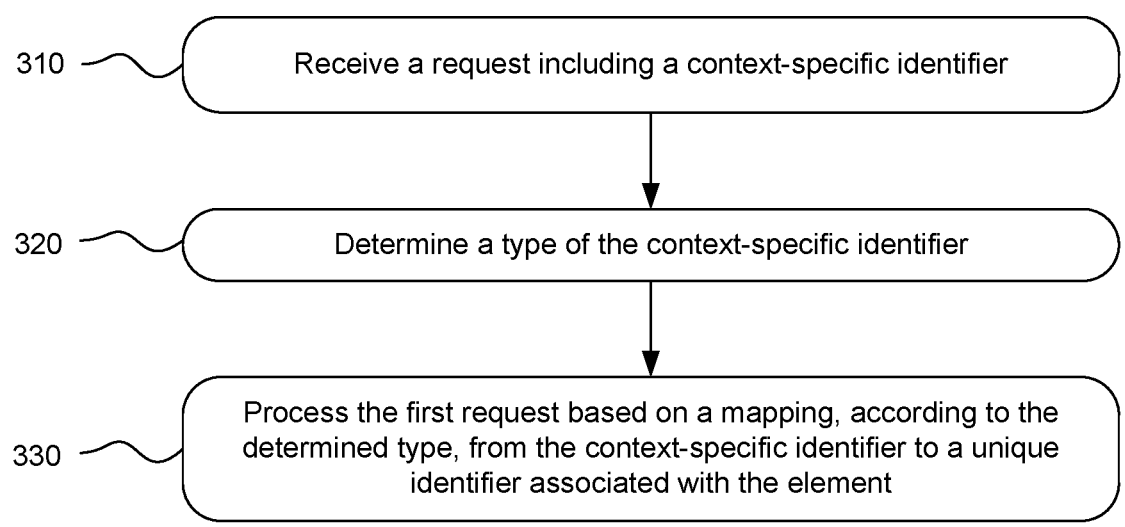
FIG. 3 illustrates an example flow chart outlining operations for polymorphic identification of entities in a virtualization environment, in accordance with some embodiments of the present disclosure.

FIG. 3 illustrates an example method 300 outlining operations for the polymorphic identification of entities in a virtualization environment. The method begins at operation 310, where the CVMs 110a-c receive a first request associated with one of the elements using an application programming interface (API) from the client 210. The first request includes a context-specific identifier. At operation 320, the CVMs 110a-c receiving the API request determines, using reflection, a type of the context-specific identifier. At operation 330, the CVMs 110a-c that receive the API request processes the first request based on a mapping, according to the determined type, from the context-specific identifier to a unique identifier associated with the element. Particular embodiments may repeat one or more steps of the method of FIG. 3, where appropriate. Although this disclosure describes and illustrates particular steps of the method 300 of FIG. 3 as occurring in a particular order, this disclosure contemplates any suitable steps of the method of FIG. 3 occurring in any suitable order.

Figure 4:
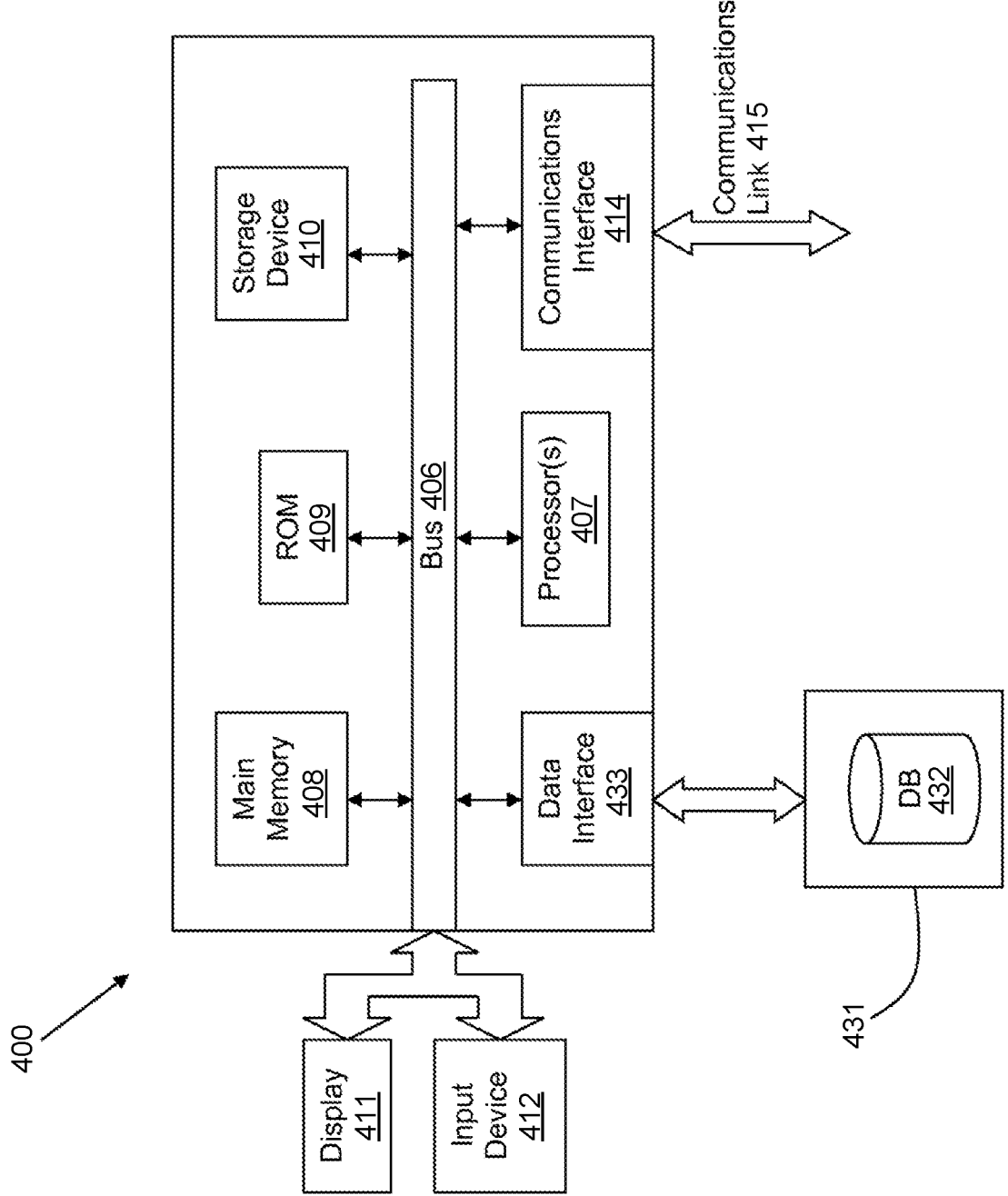
FIG. 4 illustrates a block diagram of a computing system suitable for implementing the embodiments disclosed herein.

FIG. 4 is a block diagram of an illustrative computing system 400 suitable for implementing particular embodiments disclosed herein. In particular embodiments, one or more of the computing systems 400 perform one or more steps of one or more methods described or illustrated herein. In particular embodiments, one or more of the computing systems 400 provide functionality described or illustrated herein. In particular embodiments, software running on one or more of the computing systems 400 performs one or more steps of one or more methods described or illustrated herein or provides functionality described or illustrated herein. Particular embodiments include one or more portions of one or more of the computing systems 400. Herein, reference to a computer system may encompass a computing device, and vice versa, where appropriate. Moreover, reference to a computer system may encompass one or more computer systems, where appropriate.

This disclosure contemplates any suitable number of the computing systems 400. This disclosure contemplates the computing system 400 taking any suitable physical form. As example and not by way of limitation, the computing system 400 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computing system 400 may include one or more computer systems; be unitary or distributed; span multiple locations; span multiple machines; span multiple data centers; or reside in a cloud, which may include one or more cloud components in one or more networks. Where appropriate, one or more of the computing systems 400 may perform without substantial spatial or temporal limitation one or more steps of one or more methods described or illustrated herein. As an example and not by way of limitation, one or more of the computing systems 400 may perform in real time or in batch mode one or more steps of one or more methods described or illustrated herein. One or more of the computing systems 400 may perform at different times or at different locations one or more steps of one or more methods described or illustrated herein, where appropriate.

Computing system 400 includes a bus 406 (e.g., an address bus and a data bus) or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem, Ethernet card, a network interface controller (MC) or network adapter for communicating with an Ethernet or other wire-based network, a wireless NIC (WNIC) or wireless adapter for communicating with a wireless network, such as a WI-FI network), display 411 (e.g., CRT, LCD, LED), input device 412 (e.g., keyboard, keypad, mouse, microphone). In particular embodiments, computer system 400 may include one or more of any such components.

According to particular embodiments, the computing system 400 performs specific operations by the processor 407 executing one or more sequences of one or more instructions contained in the system memory 408. Such instructions may be read into the system memory 408 from another computer readable/usable medium, such as the static storage device 409 or the disk drive 410. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware.

The term "computer readable medium" or "computer usable medium" as used herein refers to any medium that participates in providing instructions to the processor 407 for execution. Such a medium may take many forms, including but not limited to, nonvolatile media and volatile media. Non-volatile media includes, for example, optical or magnetic disks, such as the disk drive 410. Volatile media includes dynamic memory, such as the system memory 408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer may read.

In particular embodiments, execution of the sequences of instructions is performed by a single instance of the computing system 400. According to other embodiments, two or more of the computing systems 400 coupled by communication link 415 (e.g., LAN, PTSN, or wireless network) may perform the sequence of instructions in coordination with one another.

The computing system 400 may transmit and receive messages, data, and instructions, including program, i.e., application code, through the communication link 415 and the communication interface 414. Received program code may be executed by the processor 407 as it is received, and/or stored in the disk drive 410, or other non-volatile storage for later execution. A database 432 in a storage medium 431 may be used to store data accessible by the computing system 400 by way of data interface 433.

Thus, the present disclosure provides a plurality of host machines and other entities that implement a virtualization environment. The virtualization environment may also include a virtual disk comprised of multiple storage devices, the virtual disk being accessible by I/O controllers from various user virtual machines. A controller virtual machine in the virtualization environment may receive API requests associated with the monitoring and management of the various elements of the virtualization environment. The requests may include a context-specific identifier, which identifies an element associated with the request. The controller may determine, using reflection, a type of the context-specific identifier. Based on the determined type of the identifier, the controller maps the context-specific identifier to a unique identifier associated with the element. In this manner, the controller may use a single API to receive requests using heterogeneous identifiers.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
a server having a single application programming interface (API) and programmed instructions stored in a memory and executed by a processor of the server to receive a plurality of requests from one or more clients for information associated with one or more elements of a virtualization environment;
wherein each request of the plurality of requests comprises an identifier that identifies an element of the one or more elements, the identifier in each request having a type of a plurality of different types, the plurality of types being incompatible for interaction with the single API;
wherein, upon receiving a first request, a transformation module of the server:
determines the type of the identifier in the first request;
identifies a conversion function from a plurality of conversion functions based on the determined type;
transforms the identifier to a unique identifier of a element identified in the first request by using the identified conversion function,
wherein the unique identifier has a type that is compatible for interaction with the single API of the server; and
wherein the server determines a network address for the first element identified in the first request from the unique identifier and fulfils the first request using the unique identifier to interact with the single API of the server, and using the network address of the first element to retrieve the information associated with the first element identified in the first request.

2. The system of claim 1, wherein the server fulfills the request by transmitting a second request based on the unique identifier to the element and receiving a response from the element.

3. The system of claim 1, wherein the conversion function performs a mathematical formula to generate the unique identifier.

4. The system of claim 1, wherein the unique identifier comprises a hierarchical listing of a plurality of entity-type nodes in an entity-relationship graph, wherein each of the entity-type nodes represents one or more elements in the virtualization environment and each entity-type node is on a different level in the hierarchical listing.

5. The system of claim 1, wherein the conversion function performs a mapping of the identifier to the unique identifier.

6. The system of claim 2, wherein the server transmits the response along with the unique identifier of the element to the client.

7. The system of claim 1, wherein the identifier in the request identifies a location and name of the element in the virtualization environment.

8. The system of claim 1, wherein the server converts the identifier to the unique identifier by querying a database based on the function and mapping the identifier to the unique identifier of the element from the database.

9. A method comprising:
receiving, at a server having a single application programming interface (API), a plurality of requests from one or more clients for information associated with one or more elements of a virtualization environment;
wherein each request of the plurality of requests comprises an identifier that identifies an element of the one or more elements, the identifier in each request having a type of a plurality of types, the plurality of types being incompatible for interaction with the single API; and
wherein upon receiving a first request, a transformation module of the server:
determines a type of the identifier in the first request;
identifies a conversion function from a plurality of conversion functions based on the determined type; and
transforms the identifier to a unique identifier of a first element identified in the first request by using the identified conversion function, wherein the unique identifier has a type that is compatible for interaction with the single API of the server; and
wherein the server determines a network address for the first element identified in the first request from the unique identifier and fulfils the first request using the unique identifier to interact with the single API of the server, and using the network address of the first element to retrieve the information associated with the first element identified in the first request.

10. The method of claim 9, further comprising transmitting, by the server, a first response to the client, the first response comprising the unique identifier.

11. The method of claim 9, wherein the server receives a second request from a second client for information associated with the first element, the second request having a second identifier, wherein the second identifier comprises a different string than a string of the identifier to reference the first element.

12. The method of claim 9, wherein the unique identifier comprises a hierarchical listing of a plurality of entity-type nodes in an entity-relationship graph, wherein each of the entity-type nodes represents one or more elements in in the virtualization environment and each entity-type node is on a different level in the hierarchical listing.

13. The method of claim 9, wherein the unique identifier is one of a universal unique identifier, a media access control (MAC) address, a disk address, or other device identifier.

14. A non-transitory computer readable media with computer-executable instructions embodied thereon that, when executed by a processor, cause the processor to perform a process comprising:
receiving, at a server having a single application programming interface (API), a plurality of requests from one or more clients for information associated with one or more elements of the virtualization environment;

wherein each request of the plurality of requests comprises an identifier that identifies an element of the one or more elements, the identifier in each request having a type of a plurality of types, the plurality of types being incompatible for interaction with the single API;

determining a type of the identifier in a first request;

identifying a conversion function from a plurality of conversion functions based on the determined type;

transforming the identifier to a unique identifier of a first element identified in the first request by using the identified conversion function, wherein the unique identifier has a type that is compatible for interaction with the single application program interface (API) of the server; and determining a network address for the first element identified in the first request from the unique identifier and fulfilling the first request from the client using the unique identifier to interact with the single API of the server, and using the network address of the first element to retrieve the information associated with the first request.

15. The non-transitory computer readable media of claim 14, further comprising:
transmitting, by the processor, a first response to the client, the first response comprising the unique identifier.

16. The non-transitory computer readable media of claim 14, wherein fulfilling the first request comprises:
transmitting, by the processor, a second request to the first element at the network address of the first element; and
receiving, by the processor, a response from the first element comprising the requested information.

17. The non-transitory computer readable media of claim 14, wherein the processor receives a second request from a second client for requesting information from the first element, the second request having a second identifier, wherein the second identifier comprises a different string than a string of the identifier to reference the first element.

18. The non-transitory computer readable media of claim 14, wherein the unique identifier comprises a hierarchical listing of a plurality of entity-type nodes in an entity-relationship graph, wherein each of the entity-type nodes represents one or more elements in the virtualization environment and each entity-type node is on a different level in the hierarchical listing.

19. The non-transitory computer readable media of claim 14, wherein the unique identifier is one of a universal unique identifier, a media access control (MAC) address, a disk address, or other device identifier.

20. A system comprising:
a server having a single application programming interface (API) and programmed instructions stored in a memory and executed by a processor of the server to receive a plurality of requests from one or more clients for information associated with one or more elements of a virtualization environment;

wherein each request of the plurality of requests comprises an identifier that identifies an element of the one or more elements, the identifier in each request having a type of a plurality of different types, the plurality of types being incompatible for interaction with the single API;

wherein, upon receiving a first request, a transformation module of the server:
determines the type of the identifier in the first request;

identifies a conversion function from a plurality of conversion functions based on the determined type; and transforms the identifier to a unique identifier of a first element identified in the first request by using the identified conversion function, the unique identifier comprising a hierarchical listing of a plurality of entity-type nodes in an entity-relationship graph, wherein each of the entity-type nodes represents the one or more elements in the virtualization environment and each entity-type node is on a different level in the hierarchical listing, wherein the unique identifier has a type that is compatible for interaction with the single API of the server; and wherein the server fulfils the first request using the unique identifier to interact with the single API of the server to retrieve the information associated with the first element identified in the first request.

21. The system of claim 20, wherein the server fulfills the request by transmitting a second request based on the unique identifier to the element and receiving a response from the element.

22. The system of claim 20, wherein the conversion function performs a mathematical formula to generate the unique identifier.

23. The system of claim 20, wherein the conversion function performs a mapping of the identifier to the unique identifier.

24. A non-transitory computer readable media with computer-executable instructions embodied thereon that, when executed by a processor, cause the processor to perform a process comprising:
receiving, at a server having a single application programming interface (API), a plurality of requests from one or more clients for information associated with one or more elements of the virtualization environment;

wherein each request of the plurality of requests comprises an identifier that identifies an element of the one or more elements, the identifier in each request having a type of a plurality of types, the plurality of types being incompatible for interaction with the single API;

determining a type of the identifier in a first request;

identifying a conversion function from a plurality of conversion functions based on the determined type;

transforming the identifier to a unique identifier of a first element identified in the first request by using the identified conversion function, wherein the unique identifier has a type that is compatible for interaction with a single application program interface (API) of the server, the unique identifier comprising a hierarchical listing of a plurality of entity-type nodes in an entity-relationship graph, wherein each of the entity-type nodes represents the one or more elements in the virtualization environment and each entity-type node is on a different level in the hierarchical listing; and fulfilling the first request from the client using the unique identifier to interact with the single API of the server to retrieve the information associated with the first element identified in the first request.

25. The non-transitory computer readable media of claim 24, further comprising:
transmitting, by the processor, a first response to the client, the first response comprising the unique identifier.

26. The non-transitory computer readable media of claim 24, wherein fulfilling the first request comprises:

transmitting, by the processor, a second request to the first element at the network address of the first element; and receiving, by the processor, a response from the first element comprising the requested information.

27. The non-transitory computer readable media of claim 24, wherein the processor receives a second request from a second client for requesting information from the first element, the second request having a second identifier, wherein the second identifier comprises a different string than a string of the identifier to reference the first element.

28. The non-transitory computer readable media of claim 24, wherein the unique identifier is one of a universal unique identifier, a media access control (MAC) address, a disk address, or other device identifier.

* * * * *